US011966252B2

(12) United States Patent
Crosby

(10) Patent No.: US 11,966,252 B2
(45) Date of Patent: Apr. 23, 2024

(54) CLOCK DRIFT

(71) Applicant: BP Exploration Operating Company Limited, Middlesex (GB)

(72) Inventor: Alistair George Crosby, London (GB)

(73) Assignee: BP Exploration Operating Company Limited (GB)

( * ) Notice: Subject to any disclaimer, the term of this patent is extended or adjusted under 35 U.S.C. 154(b) by 112 days.

(21) Appl. No.: 17/769,011

(22) PCT Filed: Oct. 15, 2020

(86) PCT No.: PCT/GB2020/052597
§ 371 (c)(1),
(2) Date: Apr. 14, 2022

(87) PCT Pub. No.: WO2021/074628
PCT Pub. Date: Apr. 22, 2021

(65) Prior Publication Data
US 2023/0161373 A1  May 25, 2023

(30) Foreign Application Priority Data
Oct. 15, 2019 (GB) ..................................... 1914919

(51) Int. Cl.
*G06F 1/00* (2006.01)
*G06F 1/12* (2006.01)
(Continued)

(52) U.S. Cl.
CPC ................. *G06F 1/14* (2013.01); *G06F 1/12* (2013.01); *G06F 1/10* (2013.01)

(58) Field of Classification Search
CPC .... G06F 1/14; G06F 1/12; G01V 1/24; G01V 13/00; G01V 1/301; G01V 1/302; G01V 2210/62; G01V 2210/74; G04R 20/02
(Continued)

(56) References Cited

U.S. PATENT DOCUMENTS 7,548,600 B2   6/2009 Laine et al.
8,260,580 B2 * 9/2012 Laine ....................... G01V 1/32
                                              702/189
(Continued)

FOREIGN PATENT DOCUMENTS

CA        2919647 A1   11/2017
CA        2700280 A1    5/2018
WO   2009/001227 A1   12/2008

OTHER PUBLICATIONS

International Patent Application No. PCT/GB2020/052597 International Search Report and Written Opinion of the International Searching Authority dated Jan. 22, 2021 (14 pages).
(Continued)

*Primary Examiner* — Volvick Derose
(74) *Attorney, Agent, or Firm* — Conley Rose, P.C.

(57) ABSTRACT

In some examples, the disclosure provides a method for determining a drift in clock data that is provided by a clock of a seismic sensor. The sensor is exposed to an ambient temperature that varies over time. The method includes obtaining temperature data associated with the ambient temperature as a function of time. The method also includes obtaining the clock data. The method also includes obtaining timestamp data provided by a global navigation satellite system. The method also includes determining drift data which minimizes a difference of a temporal drift in the clock data, based on the timestamp data and the temperature data. The method also includes outputting corrective data based on the determined drift data.

20 Claims, 9 Drawing Sheets

(51) Int. Cl.
*G06F 1/14* (2006.01)
*G06F 1/10* (2006.01)

(58) Field of Classification Search
USPC .......................................................... 713/500
See application file for complete search history.

(56) References Cited

U.S. PATENT DOCUMENTS

| | | | | |
|---|---|---|---|---|
| 10,033,390 | B2* | 7/2018 | Melanson | H03B 5/32 |
| 11,402,526 | B2* | 8/2022 | Husom | G01V 1/16 |
| 2002/0060952 | A1* | 5/2002 | Cecconi | G01V 1/52 |
| | | | | 702/6 |
| 2007/0025484 | A1* | 2/2007 | Laine | G01V 1/26 |
| | | | | 375/355 |
| 2008/0049550 | A1* | 2/2008 | Fleure | G01V 1/24 |
| | | | | 367/14 |
| 2009/0080290 | A1* | 3/2009 | Ray | G01V 1/00 |
| | | | | 367/51 |
| 2010/0017139 | A1* | 1/2010 | Adams | G01V 1/22 |
| | | | | 702/14 |
| 2011/0032798 | A1 | 2/2011 | Ray et al. | |
| 2015/0025831 | A1* | 1/2015 | Mourey | G01K 1/022 |
| | | | | 702/130 |
| 2015/0219790 | A1* | 8/2015 | Gateman | G01V 13/00 |
| | | | | 367/13 |
| 2019/0011586 | A1* | 1/2019 | Iranpour | G01V 1/30 |
| 2019/0094402 | A1* | 3/2019 | Bunting | G06F 1/10 |
| 2021/0041586 | A1* | 2/2021 | Aanensen | G01V 1/247 |
| 2021/0263477 | A1* | 8/2021 | L'Her | G04G 3/02 |

OTHER PUBLICATIONS

GB Patent Application No. GB1914919.4 Search Report dated Dec. 23, 2019 (8 pages).

* cited by examiner

CLOCK DRIFT

CROSS-REFERENCE TO RELATED APPLICATIONS

This application is a National Phase Entry into the U.S. under 35 U.S.C. § 371 of and claims priority to PCT Application No. PCT/GB2020/052597 filed Oct. 15, 2020, entitled "Clock Drift," which claims benefit of Great Britain Patent Application No. 1914919.4 filed Oct. 15, 2019, and entitled "Clock Drift," the entire contents of each being incorporated herein by reference for all purposes.

STATEMENT REGARDING FEDERALLY SPONSORED RESEARCH OR DEVELOPMENT

Not applicable.

TECHNICAL FIELD

The disclosure relates to, but is not limited to, methods for determining drifts in clock data and methods for processing clock data. The disclosure also relates to corresponding apparatuses, computer programs or computer program products.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region.

During a seismic survey, an energy source is placed at various locations on or above the surface region of the Earth, which may include hydrocarbon deposits. Each time the source is activated, the source generates seismic (e.g., sound wave) energy that travels downward through the Earth, is reflected, and, upon its return, is recorded using one or more seismic sensors disposed on or above the subsurface region of the Earth. The seismic data is recorded by the seismic sensors, where the seismic sensors each include a clock that is configured to provide clock data. The seismic data may then be used to create an image or profile of the corresponding subsurface region.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The clock data that is provided by the clock of the seismic sensors should be accurate, so that the seismic data (which is synchronized to the clock data) may be interpreted accurately. However, the seismic sensors may be exposed to an ambient temperature that varies over time, which may cause a drift in the clock data.

Accordingly, present embodiments of the disclosure may enable determining a drift in the clock data (that is provided by the clock of a seismic sensor), where the seismic sensor is exposed to an ambient temperature that varies over time.

In some embodiments, the determined drift in the clock data may be corrected, such that the clock data of the seismic sensors is accurate, and such that the seismic data may be interpreted accurately even when the seismic sensors are exposed to an ambient temperature that varies over time.

Aspects and embodiments are set out in the appended claims. These and other aspects and embodiments are also described herein.

BRIEF DESCRIPTION OF THE DRAWINGS

Embodiments of the present disclosure will now be described, by way of example, with reference to the accompanying drawings, in which.

In the figures, similar elements bear identical numerical references.

DETAILED DESCRIPTION

Figure 1:
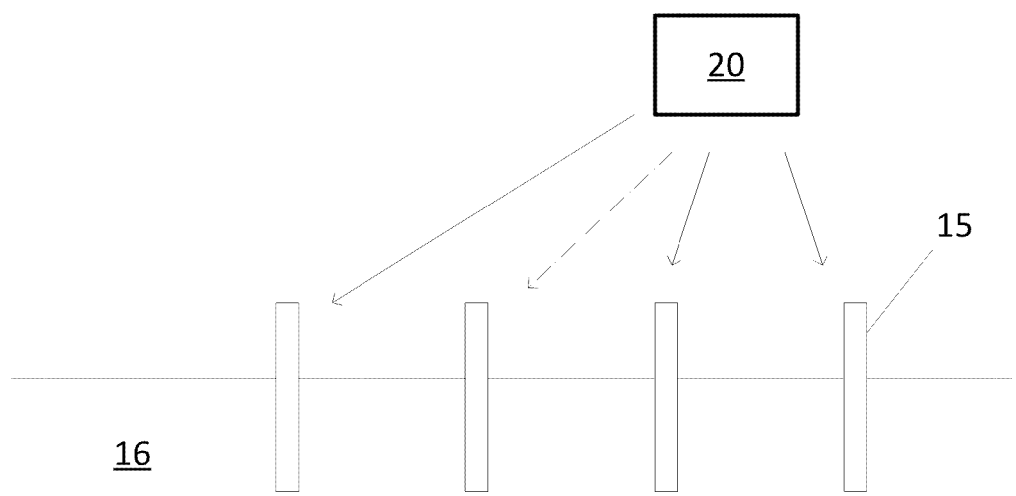
FIG. 1 schematically illustrates a plurality of example seismic sensors disposed in or above a survey area during a seismic survey.

FIG. 1 schematically illustrates a plurality of example seismic sensors 15 disposed in or above a survey area 16 of the Earth during a seismic survey. The sensors 15 are configured to record the reflected seismic energy that returns from the geological layers within the survey area 16.

A Global Navigation Satellite System (GLASS) 20 provides timestamp data to the sensors 15 during the seismic survey to help create an image or profile of the corresponding survey area 16.

Before the seismic survey starts, the sensors 15 may be initialized, e.g. calibrated. After the seismic survey is finished, the seismic data recorded by the sensors 15 may be collected and used to create an image or profile of the corresponding subsurface region.

In some embodiments, sensors 15 can operate in conjunction with control system 10 to perform initialization of the sensors 15 and/or to perform collecting of the seismic data that is recorded by the sensors 15.

Figure 2:
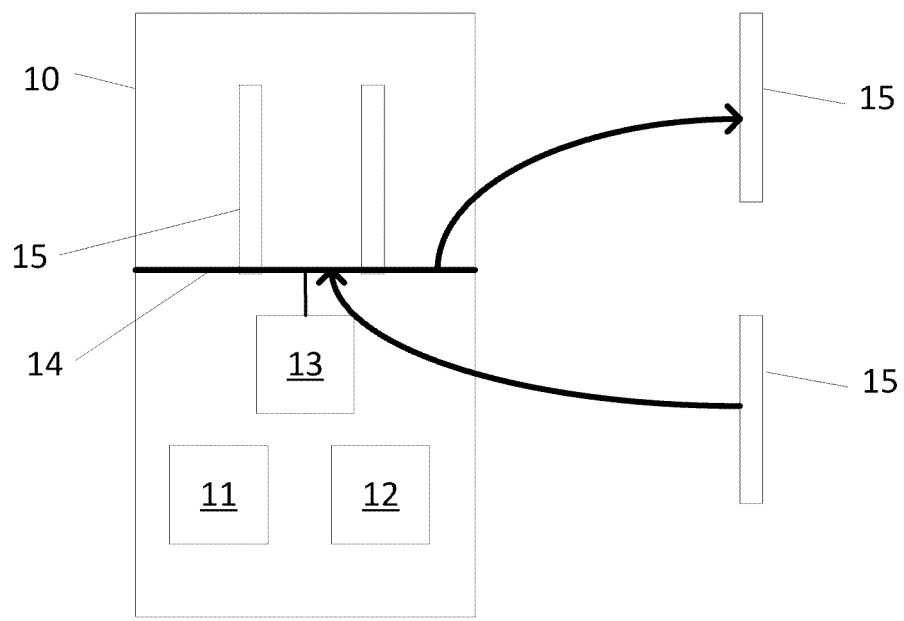
FIG. 2 schematically illustrates an example control system and a plurality of example seismic sensors.

FIG. 2 schematically illustrates an example control system 10 and a plurality of example seismic sensors 15.

The control system 10 comprises a docking station 14, where the plurality of sensors 15 may be removably docked, as illustrated by the arrows of FIG. 2.

The control system 10 can also include a processor 11, a memory 12 and/or a communication module 13 that are configured to communicate with a communication module of a sensor 15, e.g. when the sensor 15 is docked in the docking station 14 of the control system 10. The processor 11, the memory 12 and the communication module 13 can enable the initialization of the sensors 15 (e.g. during calibration). The processor 11, the memory 12 and/or the communication module 13 can also enable the collection/retrieval of the seismic data that has been recorded by the sensors 15, e.g. when the sensors are docked in the docking station 14 of the control system 10. In other words, with one example embodiment, prior to being deployed in survey area 16, sensors 15 can be initialized by being docked in docking station 14. Next, sensors 15 can record actual seismic data while sensors 15 are deployed in the survey area 16. Finally, sensors 15 can be gathered from the survey area 16 and redocked within docking station 14 in order to gather the data that was recorded by sensors 15, while sensors 15 were deployed in the survey area 16. With one or more embodiments, clock drift that results from the changing ambient temperature can be corrected at the time that the sensors 15 are redocked within docking station 14.

As illustrated in FIG. 2, each sensor 15 may have at least two configurations. In a first configuration, the sensor 15 may be docked in a docking station 14 of the control system 10, e.g. for performing initialization and/or for transporting to a survey area. In a second configuration, the sensor 15 may be deployed within a survey area for measuring seismic data.

Figure 3:
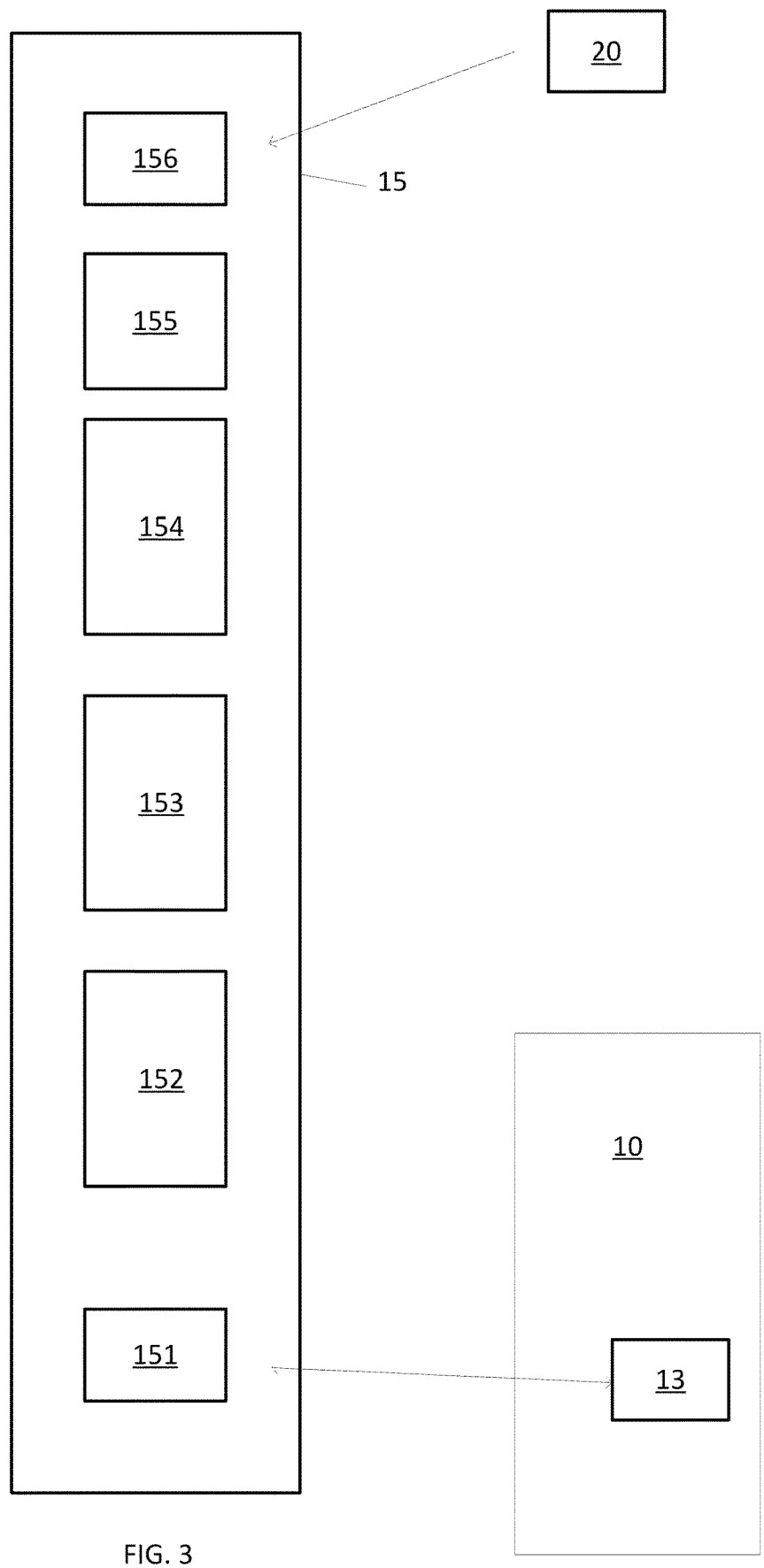
FIG. 3 schematically illustrates an example seismic sensor.

As illustrated in FIG. 3, the sensor 15 comprises a communication module 151 that is configured to communicate with the communication module 13 of the control system 10.

The sensor 15 also comprises a processor 152 and a memory 153. In some examples, the sensor 15 may comprise a thermometer 154.

The sensor 15 can also include a clock 155 that is configured to provide clock data.

The sensor 15 can include an antenna 156 that is configured to receive timestamp data that is provided by the GNNS 20. In some examples, the timestamp data that is provided by the GNNS 20 may be used by the sensor 15 to correct temporal irregularities in the periods of the clock data that are provided by the clock 155 (of sensor 15). Temporal irregularities can be considered to be divergences between the clock data of clock 155 and the received timestamp data. As described above, with one or more embodiments, the temporal irregularities can be corrected at the time that the sensors 15 are redocked within docking station 14.

One or more embodiments can consider the timestamp data (received from GNNS 20) as being a reliable/authoritative source of time data. As such, in order to correct the above-described temporal irregularities, one or more embodiments can compare the clock data (that is provided by clock 155) against the received timestamp (that is provided by the GNNS 20). In the event that deviations/discrepancies exist between the clock data and the timestamp data, one or more embodiments can consider such deviations/discrepancies to be the temporal irregularities. The above-described clock drift can be evidenced by such temporal irregularities. After comparing the received timestamp (that is provided by the GNNS 20) against the clock data (that is provided by the clock 155), sensor 15 can correct the temporal irregularities, as described in more detail below.

Figure 4:
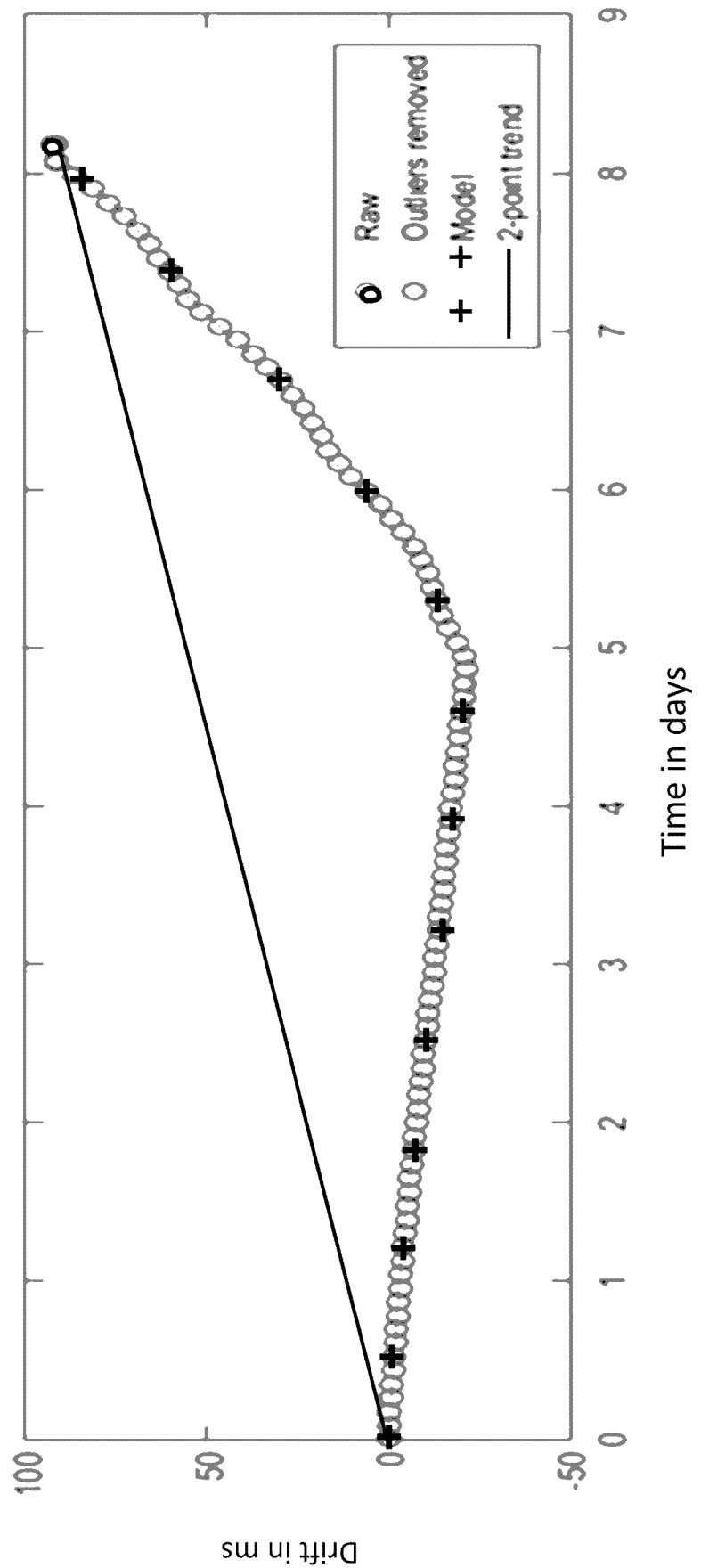
FIG. 4 schematically illustrates an example amount of clock drift that occurs to a clock over time.

FIG. 4 schematically illustrates an example amount of clock drift that occurs to a clock over time. As illustrated in FIG. 4, the clock data that is provided by a clock during a seismic survey may be affected by a drift which creates temporal irregularities over time. In FIG. 4, the curve with the circles corresponds to measurements of drift (as determined by comparing the received clock data against the received timestamp data) over a time period of around 8 days. As reflected by the curve with circles (of FIG. 4), the drift can dynamically change across the time period of 8 days. For example, between days 1-5, the drift amount tends to get further into the negative, until reaching an amount of about −25 ms. After the 5th day, the drift amount tends to increase into the positive, until reaching an amount of about 90 ms on the 8th day. As shown above, the trend of the drift amount is dynamically changing, and the dynamically changing trend cannot be accurately represented by a simplistic two-point trendline. For example, suppose that a two-point trendline is drawn between a first measurement at the beginning (of day 1) and a second measurement at the end of the 8th day. This two-point trendline would merely reflect an upward, increasing, drift, which does not accurately reflect the actual, dynamically changing drift amounts. One or more embodiments can accurately account for dynamically changing drift amounts, and one or more embodiments can correct for such dynamically changing drift amounts.

Figure 5:
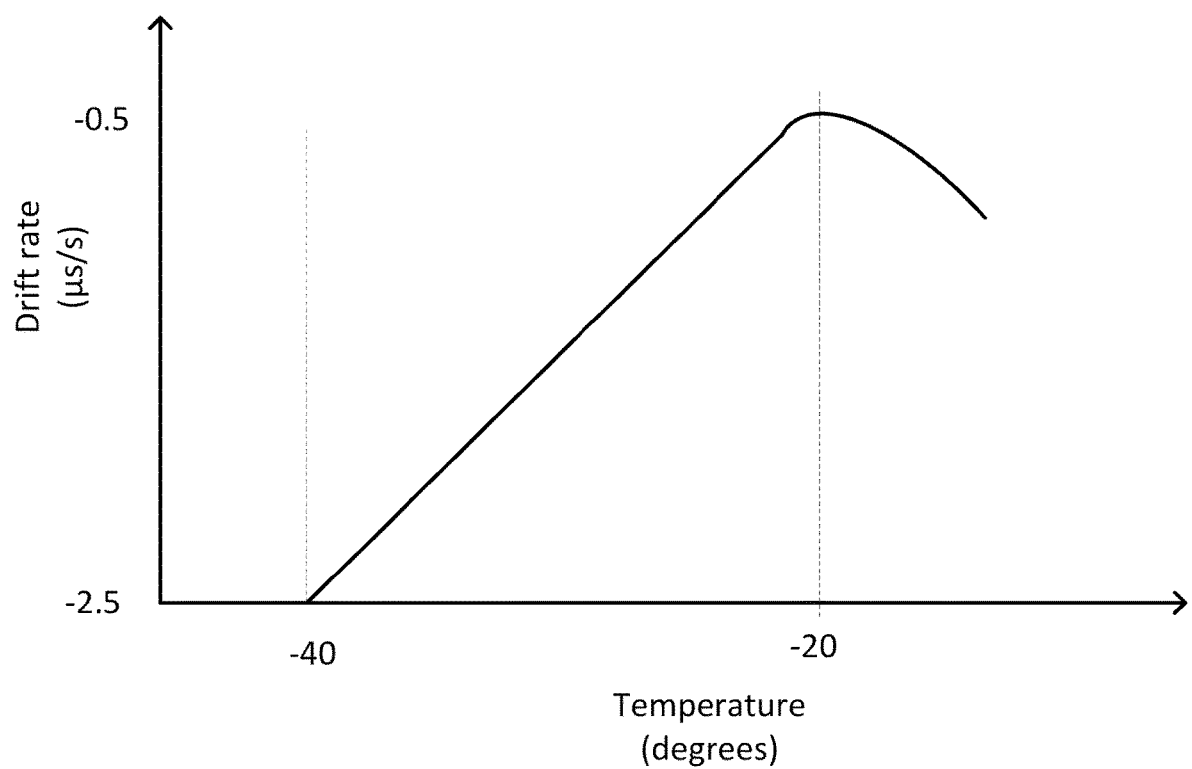
FIG. 5 schematically illustrates an example plot of a drift rate that is exhibited by clock data (expressed as a function of the ambient temperature)

FIG. 5 schematically illustrates an example plot of a drift rate that is exhibited by clock data (as expressed as a function of the ambient temperature). As illustrated in FIG. 5, the rate of the drift in the clock data during a seismic survey can be a function of the ambient temperature that surrounds the seismic sensor during collection of the seismic data. FIG. 5 schematically illustrates an example plot of a drift rate in the clock data as a function of the ambient temperature. In the example of FIG. 5, the drift rate varies linearly with the temperature within a temperature range of about 20 C (e.g. between −40 C and −20 C in FIG. 5), but the variation of the drift rate is non-linear above a certain temperature (e.g. for temperatures above −20 C in FIG. 5).

In some examples, the temperature range of the ambient temperature surrounding the sensor during seismic surveys can be so large such that the sensor may be unable to adjust its clock with sufficient regularity by using the timestamp data that is provided by the GNSS.

Accordingly, one or more embodiments can determine a drift in the clock data, where the clock data is provided by the clock of a seismic sensor, and where the seismic sensor is exposed to an ambient temperature that varies over time.

In some embodiments, the determined drift in the clock data may be adjusted/corrected, such that the clock data of the seismic sensors is made accurate, and such that the seismic data may be interpreted accurately even when the seismic sensors are exposed to an ambient temperature that varies over time.

One or more embodiments can determine an amount of drift by using received temperature data, and one or more embodiments can use the received temperature data to correct/adjust the drift.

Figure 6:
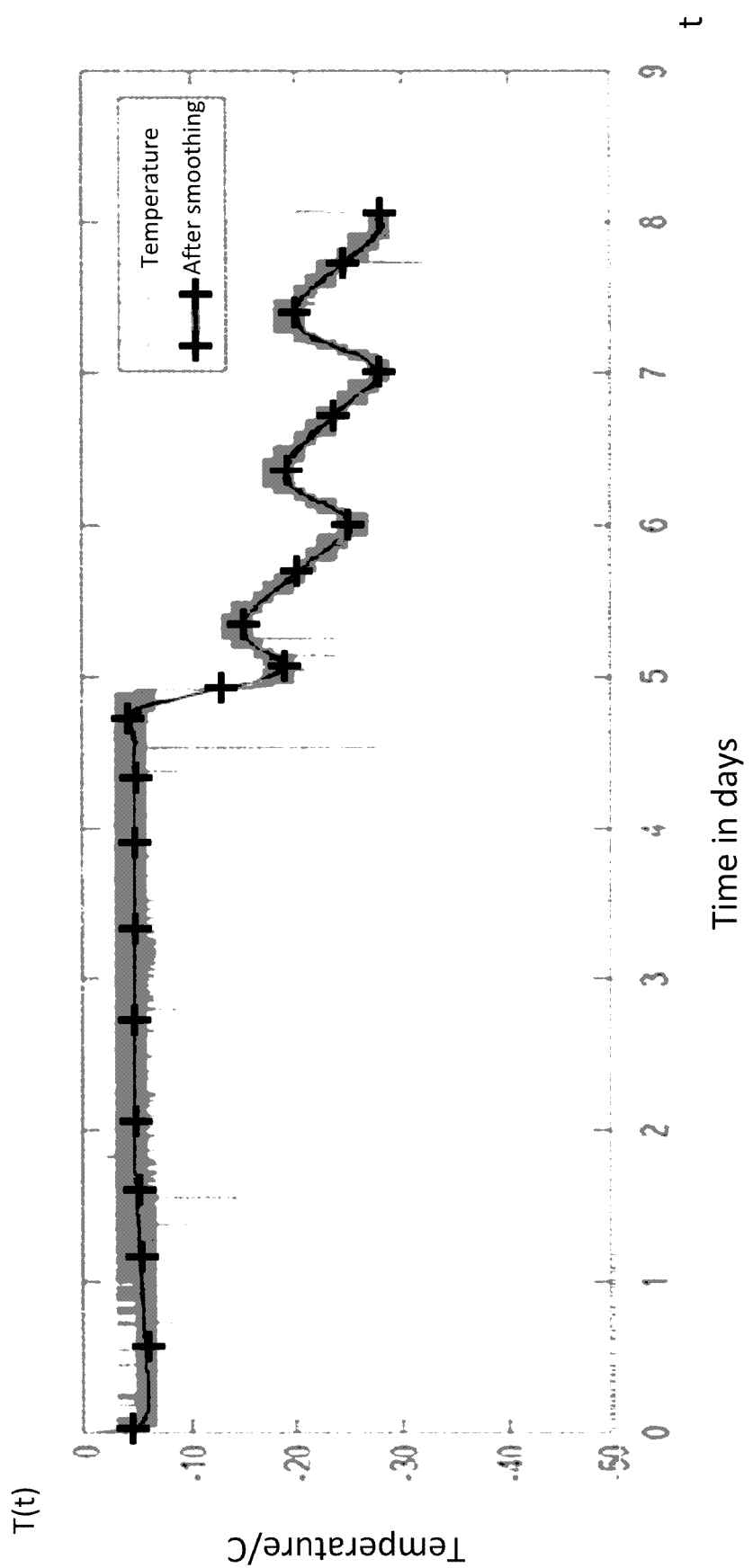
FIG. 6 shows an example plot of temperature data obtained e.g. by a thermometer of a seismic sensor and reflecting the ambient temperature, as a function of time.

FIG. 6 shows an example plot of temperature data obtained e.g. by a thermometer of a seismic sensor, which reflects the ambient temperature, as a function of time. FIG. 6 shows an example of obtained temperature data T(t) which reflects the ambient temperature surrounding the sensor, during a seismic survey, as a function of time. The obtained temperature data T(t) may be provided e.g. by a thermometer of the sensor.

As illustrated in FIG. 6, in some examples, the temperature data can be represented by a representative curve, where the representative curve is determined by performing a smoothing function upon the temperature data.

Figure 7:
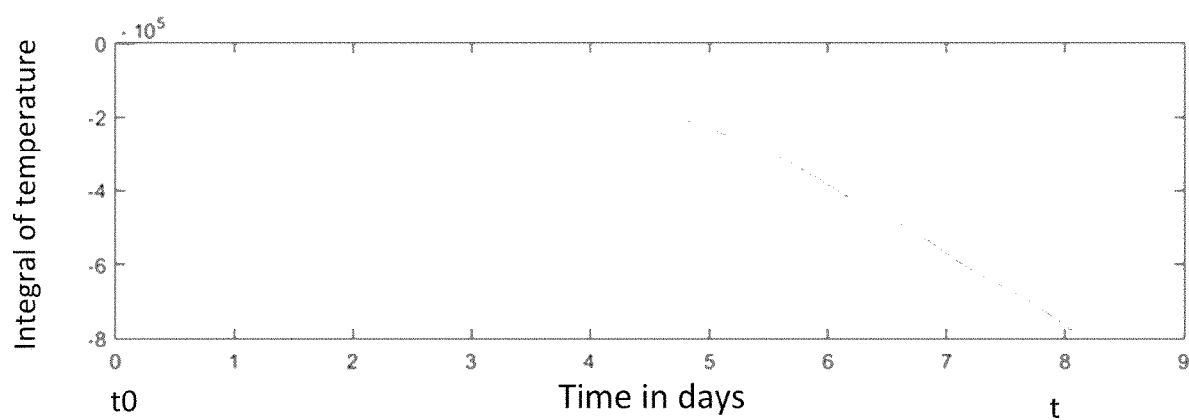
FIG. 7 shows an example chart of a determined integral of an ambient temperature T(t) between time to (associated with a start of a recording period of a sensor) and time t.

FIG. 7 shows an example of an integral of an ambient temperature T(t) between a time t0 that is associated with a start of a recording period (e.g. at a beginning of a seismic survey) and a current time t (e.g. during the seismic survey).

Figure 8:
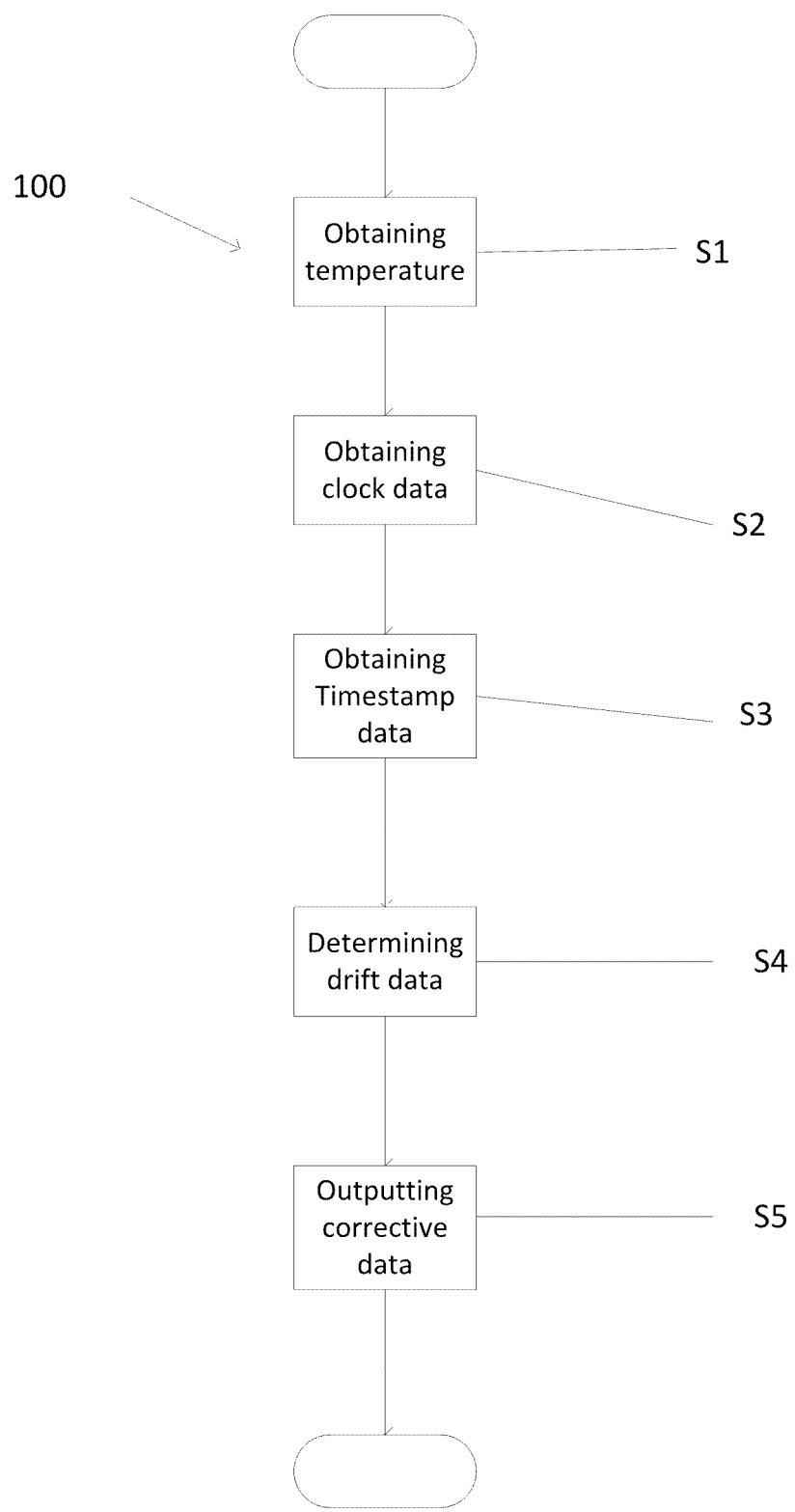
FIG. 8 shows a flow chart which schematically illustrates an example method according to the disclosure.

FIG. 8 shows a flow chart illustrating an example method 100, according to the disclosure, by using the received clock data and the received temperature data as explained above. As described in more detail below, the example method 100 can output corrective data, which may be used to correct the drift in the clock data.

The method 100 illustrated in FIG. 8 can include, at S1, obtaining temperature data that reflects the ambient temperature (around a sensor) as a function of time. As described above, the temperature data can be provided by a thermometer, for example. The method 100 can also include, at S2, obtaining clock data that is provided by a clock of the sensor.

In some examples, the temperature data that is obtained at S1 may be provided by the thermometer of the sensor. Alternatively or additionally, the temperature data may be provided by other means, such as by other thermometers, e.g. thermometers provided in the control system. As described above, the control system can operate in conjunction with the sensors when initializing the sensors or when retrieving/collecting the seismic data from the sensors.

An example of obtained temperature data is illustrated in FIG. 6 and has been already discussed. The obtained temperature data can be used to correct for drift, as described in more detail below.

In addition to the clock data obtained (at S2), one or more embodiments can also obtain timestamp data (at S3) that is provided by the GNSS. As described above, by comparing the timestamp data against the clock data that is provided by the clock of the sensor, one or more embodiments can determine drift data (at S4) that reflects a temporal drift in the dock data, by determining a difference between the clock data (that is provided by the clock) and the timestamp data (that is provided by the GNSS). Differences between the clock data and the timestamp data can indicate that drift has occurred.

The method 100 may further comprise determining and outputting, at S5, corrective data. One or more embodiments can use the determined corrective data to correct the clock data, as explained below. As described below, the corrective data can be determined based on the received temperature data.

In some examples, determining, at S5, the corrective data comprises parameterizing drift D(t), where:

$$D(t)=[a\times\theta(t)]+(b\times t) \quad (E)$$

In the equation (E) above, θ is an integral of the ambient temperature T(t) between time t0, associated with a start of a recording period for the sensor, and a current time t, during the recording period of the sensor, such that:

$$\theta(t)=\int_{t0}^{t} T.$$

An example of θ is illustrated in FIG. 7 and has already been discussed.

In some examples, the recording period may correspond to e.g. a few hours or a few days. In some examples, the recording period may correspond to a duration of a seismic survey during which the seismic sensor is deployed for measuring seismic data.

In the drift D(t) of equation (E) above, the parameters (a, b) are parameters which are determined in order to minimize a difference between D(t) and a measured temporal drift (as determined by comparing the clock data against the timestamp data). As such, with one or more embodiments, determining the corrective data at S5 can include determining parameters (a, b). D(t0) may be such that:

$$D(t0)=0.$$

It should thus be understood that, at S5, one or more embodiments determine the corrective data, where the difference between the determined drift data and the measured temporal drift is minimized.

In other words, by determining the parameters (a, b) to minimize the above-described difference, one or more embodiments can determine a best-fit curve to describe the drift D(t).

The method 100 of FIG. 8 further comprises outputting, at S5, corrective data based on the determined drift data. The drift in the clock data may be corrected, based on the outputted corrective data. In some examples, determining the corrective data comprises determining parameters (a, b) for equation (E).

With one or more embodiments, once the corrective data is determined, the corrective data can be used to correct occurrences of drift in the clock data. Such correction can occur when data that is recorded by the sensors is being gathered by the docking station, for example. In other words, with one or more embodiments, the corrective data corrects occurrences of drift after the data has all been received by the sensor.

In some examples, outputting the corrective data (at S5) can include performing at least one of:
(1) storing the corrective data in the memory of the seismic sensor and/or in the memory of the control system (e.g. for further reference); and/or (2) providing the corrective data to the processor of the seismic sensor and/or to the processor of the control system (e.g. for immediate use, e.g. for correction of the drift).

As illustrated in FIGS. 5 and 6 (discussed above), the ambient temperature may vary within one or more temperature ranges during one or more recording periods. In the example of FIG. 5, the ambient temperature varies between a first range (e.g. a range of temperatures below −40 C), a second range (e.g. a range between −40 C and −20 C), and a third range (e.g. a range above −20 C), for example. The method may thus include determining the corrective data that corresponds to each temperature range of the ambient temperature.

In some examples, determining the corrective data comprises determining parameters (a, b) for equation (E), as described above.

Alternatively or additionally, in some examples, the corrective data may comprise temperature data. As described above, the correction data can correspond to different temperature ranges of the ambient temperature. The temperature data associated with the corrective data may comprise data associated with at least one of the following:
a maximum temperature of each temperature range; and/ or a minimum temperature of each temperature range; and/or an average temperature of each temperature range.

In some examples, outputting the corrective data, at S5, may comprise storing the corrective data corresponding to each temperature range in a library that is associated with a plurality of temperature ranges. The library may be located in the memory of the sensor and/or in the memory of the control system.

Figure 9:
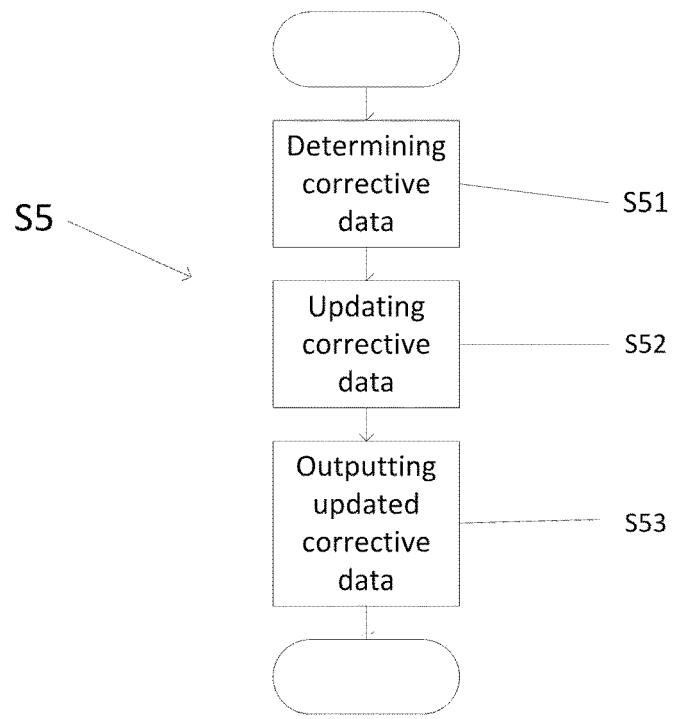
FIG. 9 shows a flow chart which schematically illustrates detailed steps of the example method of FIG. 8.

As illustrated in FIG. 9, one or more embodiments, at S5, can output the corrective data by performing at least one of the following: Method S5, at S51, includes determining one or more corrective data for one or more calibration periods and/or one or more seismic survey periods. Method S5, at S52, can also include updating, at S52, the determined one or more corrective data (which was previously determined). Method S5, at S53, includes outputting the updated corrective data.

Figure 10:
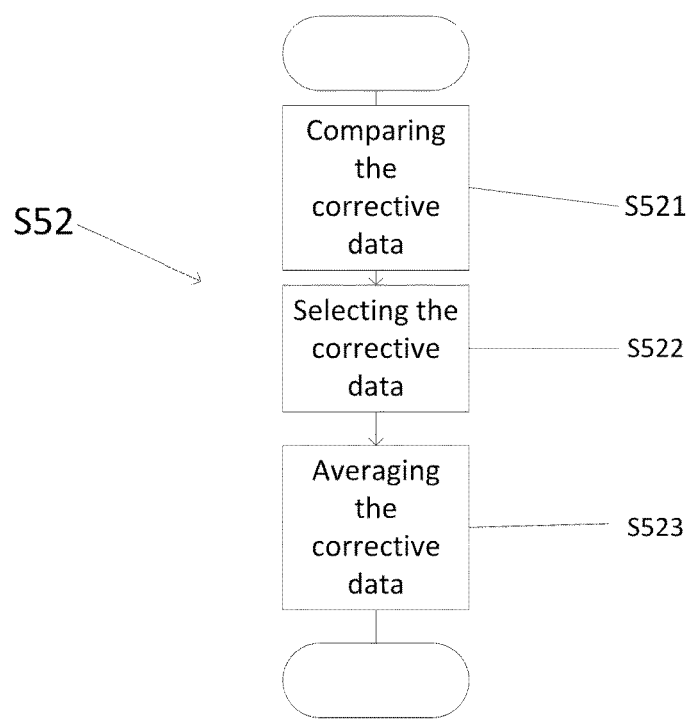
FIG. 10 shows a flow chart which schematically illustrates other detailed steps of the example method of FIG. 8.

As illustrated in FIG. 10, in some examples, updating at S52 the determined one or more corrective data (which was previously determined) may include at least one of the following. As described above, the corrective data can include, at least, parameters (a, b), which allow calculation of drift from temperature. Method S52 includes, at S521, comparing the determined one or more corrective data (e.g. comparing previously-determined corrective data against newly-determined corrective data). Method S52 can also include selecting, at S522, the determined one or more corrective data, based on the comparing. In other words, the newly-determined corrective data can be selected as the applicable corrective data. Method S52 can also include averaging, at S523, the determined one or more corrective data. In other words, the previously-determined corrective data can be combined and/or averaged with the newly-determined corrective data.

In some examples, selecting (at S522) the determined one or more corrective data may comprise outputting the corrective data outputted during a previous one or more recording periods for the sensor and/or for at least one other sensor.

In some examples, the method 100 may be implemented, at least partly, by system 10 of FIG. 2 and/or the sensor 15 of FIG. 3.

The method 100 may enable reducing the presence of timing errors within seismic data, where the seismic data is provided by sensors, and where the sensors have been unable to adjust their clocks with sufficient regularity by using timestamp data that is provided by the GNSS 20.

Figure 11:
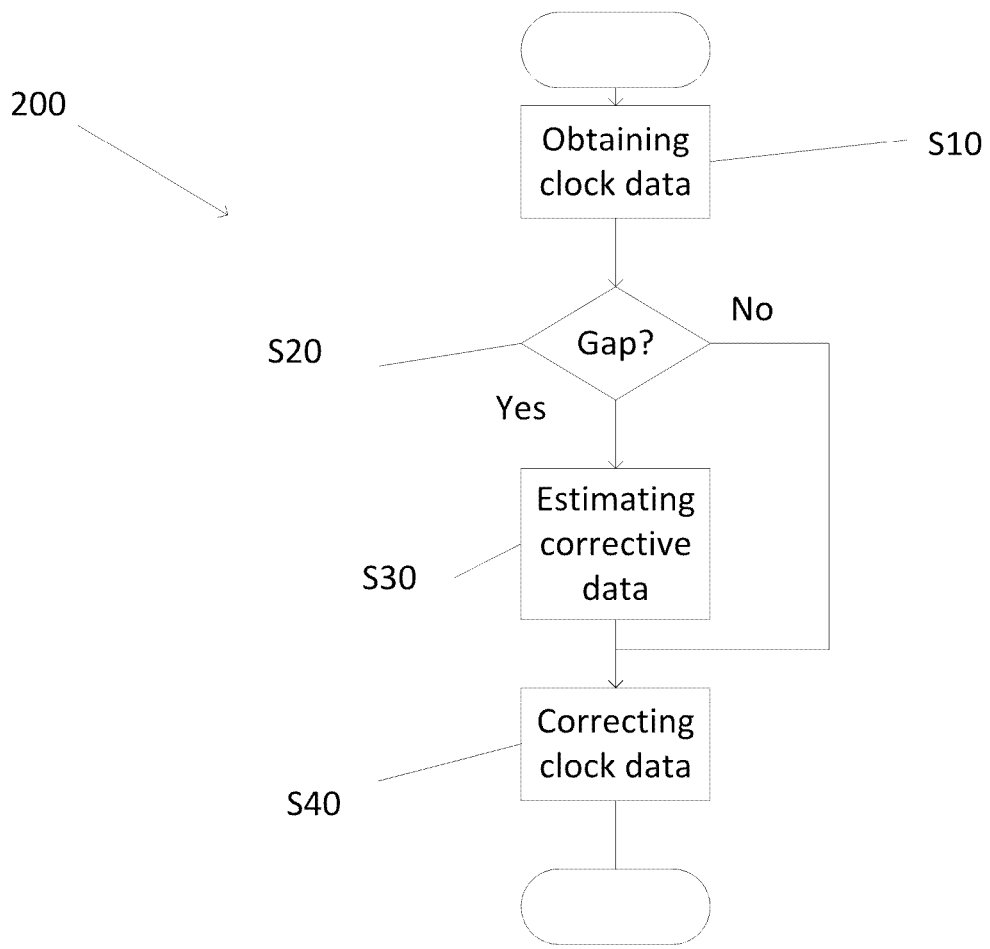
FIG. 11 shows a flow chart which schematically illustrates another example method according to the disclosure.

FIG. 11 schematically illustrates a method 200 for processing clock data that is provided by the clock of a seismic sensor, where the seismic sensor has been exposed to an ambient temperature that varies over time.

The method 200 illustrated in FIG. 11 can include one or more of, obtaining, at S10, the clock data and timestamp data (where the timestamp data is provided by the global navigation satellite system). Method 200 can also include determining, at S20, whether the obtained timestamp data comprises at least one temporal gap greater than a predetermined threshold.

With one or more embodiments, a temporal gap can be defined as a duration of time between successive receptions of timestamp data from the GNSS. With one or more embodiments, the predetermined threshold can be a duration of time between 1 hour and 10 hours, such as, for example, 6 hours. In that example, a temporal gap of more than 6 hours means that the sensor did not receive the timestamp data from the GNSS for at least 6 hours.

If it is determined at S20 that the obtained timestamp data comprises at least one determined temporal gap greater than a predetermined threshold, the method 200 may further comprise estimating, at S30, corrective data associated with a drift in the clock data as a function of the time and the ambient temperature. In some examples, the corrective data may be determined, at least partly, by the method 100 according to the disclosure, for the sensor and/or for at least one other sensor.

The method 200 may further comprise, for each temporal gap that is greater than the predetermined threshold, correcting, at S40, the corresponding clock data based on the obtained corrective data.

The method 200 may enable reducing timing errors in seismic data that are provided by sensors, where the sensors have been unable to adjust their clocks with sufficient regularity by using timestamp data that is provided by the GNSS 20.

In some examples, the method 200 may be implemented, at least partly, by system 10 of FIG. 2 and/or sensor 15 of FIG. 3.

Modifications and Variations

In some examples, alternatively or additionally the communication module 151 of FIG. 3 may be configured to wirelessly communicate with the communication module 13.

In some examples, communication between the communication module 13 and the communication module 151 of FIG. 3 may include at least one of the following:

(1) configuration data from the control system 10 to the sensor 15, e.g. for setting a recording gain of the sensor 15; and/or
(2) seismic data from the sensor 15 to the system 10, e.g. during and/or after a seismic survey; and/or
(3) the temperature data from/to the sensor 15 to/from the system 10, e.g.
during and/or after a seismic survey; and/or
(4) the drift data from/to the sensor 15 to/from the system 10, e.g. during and/or after a seismic survey; and/or
(5) the corrective data from/to the sensor 15 to/from the system 10, e.g. during and/or after a seismic survey.

Other data may also be envisaged.

In some examples, the effects of the clock ageing and/or the effects of hysteresis can either be negligible or there can be sufficient timestamp data to characterize them. With one or more embodiments, for a given clock, the main determinant of clock drift variations is the changes in the ambient temperature. In some examples, the temperature of the sensor can be recorded continuously throughout its deployment.

The invention claimed is:

1. A method for determining a drift in clock data that is provided by a clock of a seismic sensor, wherein the sensor is exposed to an ambient temperature that varies over time, the method comprising:
    obtaining temperature data from the seismic sensor exposed to the ambient environment, wherein the temperature data is associated with the ambient temperature as a function of time;
    obtaining the clock data;
    obtaining timestamp data provided by a global navigation satellite system;
    determining a temporal drift in the clock data based on a difference between the clock data and the timestamp data; and
    determining corrective data to correct the clock data using the temporal drift and the temperature data obtained from the seismic sensor whereby the temporal drift in the clock data is minimized.

2. The method of claim 1, wherein the temperature data and/or the clock data are obtained over at least one recording period, and wherein determining the corrective data comprises parameterizing drift D(t), such that:

$$D(t)=[a\times\theta(t)]+(b\times t)$$

with θ being an integral of the ambient temperature T(t) between time t0 associated with a start of the at least one recording period and time t, such that:

$$\theta(t)=\int_{t0}^{t}T$$

with parameters (a, b) being determined to minimize a difference between D(t) and the temporal drift, and D(t0)=0.

3. The method of claim 2, wherein the corrective data comprises the parameters (a, b).

4. The method of claim 2, wherein at least one recording period corresponds to a measurement period wherein the seismic sensor is deployed for measuring seismic data, and/or wherein the temperature data and/or the clock data are obtained over at least one recording period corresponding to a calibration period.

5. The method of claim 4, wherein determining the corrective data further comprises:
determining one or more corrective data for one or more calibration periods and/or one or more measurement periods;
updating the determined one or more corrective data to provide updated corrective data; and
outputting the updated corrective data.

6. The method of claim 5, wherein updating the determined one or more corrective data comprises at least one of the following:
selecting the determined one or more corrective data; and/or
averaging the determined one or more corrective data.

7. The method of claim 1, wherein the temperature data and/or the clock data are obtained over at least one recording period corresponding to a calibration period, and wherein determining the corrective data comprises determining the corrective data based on the temporal drift in the clock data observed over a recording period of at least one day, wherein the timestamp data comprises timestamp data complete over the recording period.

8. The method of claim 7, wherein the timestamp data is obtained periodically, and the temperature data is obtained continuously.

9. The method of claim 1, further comprising:
storing the corrective data in a memory of the seismic sensor and/or of a control system; and/or
providing the corrective data to a processor of the seismic sensor and/or of the control system.

10. The method of claim 1, wherein the ambient temperature varies within at least one temperature range during one or more recording periods, and wherein determining the corrective data comprises determining the corrective data for each temperature range.

11. The method of claim 10, wherein the corrective data associated with the temperature data comprises data associated with at least one of the following:
a maximum temperature of each temperature range; and/or
a minimum temperature of each temperature range; and/or
an average temperature of each temperature range.

12. The method of claim 1, wherein the corrective data comprises temperature data.

13. The method of claim 12, wherein outputting the corrective data comprises:
storing the corrective data corresponding to each temperature range in a library associated with a plurality of temperature ranges.

14. The method of claim 1, wherein obtaining the temperature data comprises filtering the temperature data for smoothing the temperature data.

15. The method of claim 1, further comprising:
correcting the drift in the clock data, based on the corrective data.

16. Apparatus comprising a processor and a memory, the memory comprising instructions which, when executed by the processor, enable the processor to perform the method of claim 1.

17. A computer program or a computer program product comprising instructions which, when executed by a processor, enable the method enable the processor to perform the method of claim 1.

18. A method for processing clock data that is provided by a clock of a seismic sensor, wherein the sensor is exposed to an ambient temperature that varies over time, the method comprising:
obtaining the clock data;
obtaining timestamp data provided by a global navigation satellite system;
determining whether the clock data comprises at least one temporal gap greater than a predetermined threshold in the provided timestamp data;
if the clock data comprises at least one determined temporal gap,
obtaining corrective data associated with a drift in the clock data as a function of the time and the ambient temperature; and
for each of the at least one determined temporal gap, correcting the clock data based on the obtained corrective data.

19. The method of claim 18, wherein the corrective data is determined by:
obtaining temperature data associated with the ambient temperature as a function of time;
determining drift data which minimizes a difference of a temporal drift in the clock data, based on the timestamp data and the temperature data; and
outputting the corrective data based on the determined drift data.

20. The method of claim 19, wherein the timestamp data is obtained periodically, and the temperature data is obtained continuously.

* * * * *